3,284,454
PHARMACOLOGICALLY ACTIVE ACRIDANS AND THEIR SALTS
Marc Häring, Istvan Molnar, and Theodor Wagner-Jauregg, all of Zofingen, Switzerland, assignors to Siegfried Aktiengesellschaft, Zofingen, Switzerland, a corporation of Switzerland
No Drawing. Filed Dec. 13, 1962, Ser. No. 244,249
Claims priority, application Switzerland, Dec. 18, 1961, 14,646/61; Aug. 3, 1962, 9,307/62
3 Claims. (Cl. 260—279)

This inventor relates to novel 5,5-dialkyl N-alkylaminoalkyl acridans and salts thereof which have useful pharmacological and clinical activity.

The acridans of this invention can be used to abate mental disturbances, such as depression or anxiety, delusion, confusion or physical excitation without concomitant physical incapacitation. They antagonize reserpine-induced symptoms in rats and mice, serotonine-, histamine-, and barium-induced spasms in the guinea pig intestine and they have a strong antitremorine and anticonvulsive effect (electroconvulsion, strychnine- and nicotine-induced convolusion in the mouse) and a local anesthetic effect. They have only a weak anticholinergic effect, a small effect on blood pressure and vascular periphery and low toxicities, which greatly enhances their utility.

The acridans of this invention are represented by the following structure:

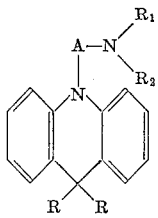

when:

R represents a lower alkyl with 1 to 4 carbon atoms, A represents a straight or branched alkylene chain containing 2 to 3 carbon atoms, $R_1$ and $R_2$ either represent lower alkyl groups such as methyl or ethyl, or one of them is hydrogen. They also may be ethylene groups, linked together by an alkyl-, or hydroxyalkyl-bearing nitrogen atom to form a substituted piperazine ring.

Preferred compounds of this invention having particular clinical utility are represented by the following structures:

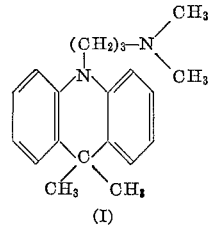 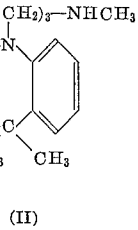

(I)                    (II)

The compounds of this invention are prepared by alkyl aminoalkylation of the corresponding acridans which are known or readily prepared by following the prior art, or by ring closure of a "carbinol" of the formula

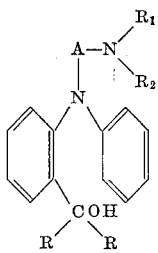

when:

R, $R_1$ and $R_2$ have the same meaning as in the formula given in column 1.

Alkylaminoalkylation can be performed by reacting the lo-substituted acridans or "carbinols" with a reactive dialkylaminoalkylester such as a halide, preferably chloride or bromide, or an arylsulfonate, such as p-tosylate or phenylsulfonate in a suitable inert solvent, such as benzene, xylene or toluene, in which at least one of the reactants should be soluble. A suitable acid binding agent may be included, such as an alkali metal amide, preferably sodium amide or potassium amide; an alkali metal hydride, preferably sodium hydride; an alkali metal aryl or alkyl compound, preferably phenyl sodium, butyl sodium or octyl sodium.

If an acid addition salt of the reactive dialkylaminoalkylester is used, a corresponding increase in the amount of acid-binding agent must be used. However, the preferred method of alkylation is to react the acridan or the "carbinol" with a dialkylaminoalkylchloride or bromide with a slight excess of sodium or potassium amide in refluxing benzene, toluene or xylene for at least one hour.

Other methods of preparation are:

(1) The reaction of an acridan or "carbinol" with a 1,3-dihalogenopropane, for instance with 1-chloro-3-bromo propane to form the corresponding N-γ-chloro (halogeno) alkyl derivative and to react this with the appropriate amine.

(2) Preparation of the N-β-cyanoethyl acridan derivative by addition of acrylonitril to an acridan followed by reduction of the cyanogroup to $NH_2$ and alkylation of the aminogroupe.

(3) Reaction of a halogeno acid halogenide with the acridan followed by reaction of the formed halogeno acid amide with an amine and reduction of the amido keto group to $CH_2$, for instance with $LiAlH_4$.

(4) Reaction of a 5,5-dialkyl acridan with phosgene and treatment of the formed >N—COCl derivative with a dialkylaminoalkanol, followed by splitting off $CO_2$ to form the desired amino compound.

The N-monoalkylaminoalkyl acridan derivates are prepared for instance by reacting the corresponding halogeno compounds with N-alkyl-N-benzylamine followed by hydrogenolysis of the benzyl radical.

The dehydration of the "carbinols"

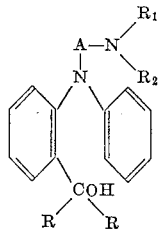

to form the corresponding acridans can be done with catalysts, for instance concentrated or dilute acids, e.g. polyphosphoric acid, phosphoric acid, sulfuric acid, or with acid anhydrides, e.g. $P_2O_5$ or with metal and metalloid halogenides, e.g. $BF_3$, $AlCl_3$, and certain addition compounds of these Lewis acids.

This invention also includes salts of the above defined bases formed with nontoxic pharmaceutically acceptable organic and inorganic acids. Such salts are easily prepared by methods known to the art. The base is reacted with either the calculated amount of organic or inorganic acide in a water-miscible solvent, such as acetone or ethanol, with isolation of the salt by concentration and cooling; or with an excess of the acid in a water-immiscible solvent, such as ethyl acetate, ethyl ether or chloroform with the desired salt separating directly.

Exemplary of such organic salts are those with maleic, fumaric, itaconic, benzoic, ascorbic, pamoic, succinic, aspartic, methanesulfonic, ethanedisulfonic, acetic, propionic, tartaric, salicylic, citric, gluconic, lactic, malic, mandelic, cinnamic, palmitic, glycolic, glutamic, benzenesulfonic, and theophylline acetic acids as well as with the 8-halotheophyllines. Exemplary of such inorganic salts are those with hydrochloric, hydrobromic, sulfuric, sulfamic, phosphoric, and nitric acids. These salts may also be prepared by the classical method of double decomposition of appropriate salts which is well known to the art.

The new compounds of this invention are administered to human beings parenterally or orally, eventually in combination with a pharmaceutical carrier. The carrier may be a solid or liquid. If a solid carrier is desired, the medicament is mixed with the carrier, such as talc, mannitol, lactose or cornstarch, and filled into a soft gelatin capsule.

Alternatively, the mixture of the compound of this invention is mixed with the carrier together with tableting aids, such as starch or magnesium stearate, granulated using sucrose or gelatin solution and tableted. Suitable liquid carriers are the oils, such as animalic or vegetable oil, which are mixed with the medicament to form a thick paste and then filled into soft gelatin capsules. Other liquid carriers may be an aqueous suspension, such as in a medium consisting of water, sodium carboxymethylcellulose and a montmorillonite.

The following examples are illustrative of the compounds of this invention and their preparation.

*Example 1*

A mixture of 10.0 g. of 5,5-dimethylacridan, 2.0 g. of pulverized sodium amide and 6.5 g. of 1-chloro-3-dimethylaminopropane in 50 ml. of xylene is heated at reflux with stirring for one hour. To the cooled reaction mixture one adds one volume of water. The organic layer is separated and extracted several times with diluted lactic acid. The acidic extracts are combined, washed with ether and neutralized by alkali. The crude 10-(3'-dimethylaminopropyl)-5,5-dimethylacridan is isolated by ether extraction and purified by distillation in a high vacuum. The yield is 6.4 g. B.P. 170–80°/0.005 mm. $n_D^{20}=1.5990$.

$C_{20}H_{26}N_2$ (294.3). Calcd.: C, 81.6; H, 8.9; N, 9.5. Found: C, 81.7; H, 9.0; N, 9.3.

43 g. of the base I are dissolved in 229 ml. of 1 N aqueous d-tartaric acid and the clear solution so obtained is evaporated to dryness under reduced pressure. The residue is dissolved in 150 ml. of 90% ethanol which solution after cooling gives the tartaric acid salt of I in white needles. The salt contains 1 mole of tartaric acid per 1 mole of the base. M.P. 155–6°. Easily soluble in cold water.

$C_{20}H_{26}N_2 \cdot C_4H_6O_6$ (444.5). Calcd.: C, 64.83; H, 7.26; N, 6.30. Found: C, 65.02; H, 7.32; N, 6.49.

The malic acid salt of I is less soluble in water; it contains 1 mole malic acid per 1 mole of the base. M.P. 154°.

*Example 2*

Following the general procedure of Example 1 a suspension of 5,5-diethylacridan, sodium amide and 1-chloro-3'-dimethylaminopropane in xylene gave, 10-(3'-dimethylaminopropyl)-5,5-diethylacridan as a yellow oil. B.P. 190°/0.35 mm. $n_D^{20}=1.5923$.

*Example 3*

A mixture of 14 g. of finely pulverized sodium amide, 65 g. of 5,5-dimethylacridan and 67.5 g. of 1-chloro-3-(N-benzyl-N-methylamino)-propane in 400 ml. of carefully dried xylene are stirred and heated at reflux for one hour. The unreacted sodium amide is decomposed by quenching the mixture with water and the organic xylene-layer is extracted with several portions of diluted lactic acid. The combined acid extracts are neutralized with alkali and extracted with ether. 5,5-dimethyl-10-[3'-(N-benzyl-N-methyl-amino)-propyl]-acridan is obtained by evaporation of the dried ether extract as a crude oil which is rectified by distillation in a high vacuum. B.P. 198–200°/0.01 mm. $n_D^{20}=1.5930$. The yield is 58.6 g.

$C_{26}H_{30}N_2$ (370.). Calcd.: C, 84.26; H, 8.17. Found: C, 84.15; H, 8.35.

15.0 g. of the base and 3.0 g. of palladium on charcoal (5%) in 120 ml. of 95% ethanol are shaken in a pressure bottle at 140 p.s.i. and 55° C. until no more hydrogen is absorbed. The mixture is filtered and the solvent evaporated under diminished pressure. The oily residue is 10-(3'-methylaminopropyl)-5,5-dimethyl acridan (II) in an almost pure state. The base is rectified under high vacuum. B.P. 150–52°, 0.005 mm., $n_D^{20}=1.6116$. A water-soluble, crystalline salt of the base II is obtained by dissolving the compound in an equivalent quantity (1:1 mols) of a 1 N solution of methanesulfonic acid in water and evaporating the solution to dryness. The methane sulfonic acid salt is obtained in fine needles, when ether is carefully added to a solution in absolute ethanol. M.P. 147–8°.

$C_{19}H_{24}N_2 \cdot CH_4O_3S$ (376.5) Calcd.: C, 63.75; H, 7.49; S, 8.51. Found: C, 63.87; H, 7.45; S, 8.45.

What we claim is:

1. A chemical compound selected from the class consisting of a free base and its pharmaceutically acceptable nontoxic acid addition salts, said free base having the formula

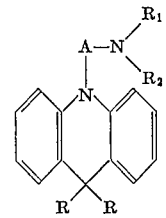

in which R is lower alkyl having 1–4 carbon atoms; A is alkylene having 2–3 carbon atoms; and $R_1$ and $R_2$, when individual groups, are selected from the group consisting of lower alkyl and hydrogen, only one of said $R_1$ and $R_2$ being hydrogen, and when $R_1$ and $R_2$ are part of a chain, they are ethylene groups linked together by a group selected from the class consisting of alkyl-bearing nitrogen atom and hydroxyalkyl-bearing nitrogen atom to form a piperazine ring.

2. A compound selected from the group of compounds having the following formula

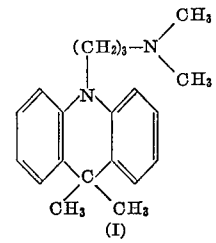

and pharmaceutically acceptable nontoxic acid addition salts thereof.

3. A compound selected from the group of compounds having the following formula

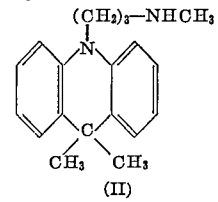

and pharmaceutically acceptable nontoxic acid addition salts thereof.

References Cited by the Examiner
UNITED STATES PATENTS

| | | | |
|---|---|---|---|
| 2,099,826 | 11/1937 | Schaffer et al. | 260—279 |
| 2,528,162 | 10/1950 | Mills | 260—279 |
| 2,586,370 | 2/1952 | Mills | 260—279 |
| 2,767,966 | 4/1954 | Cusic | 260—279 |
| 2,997,422 | 8/1961 | Tedeschi | 167—65 |
| 3,012,036 | 12/1961 | Tendick | 260—279 |
| 3,043,842 | 7/1962 | Craig | 260—279 |
| 3,072,530 | 1/1963 | Hoffmann | 167—65 |

ALEX MAZEL, *Primary Examiner.*

FRANK CACCIAPAGLIA, JR., HENRY R. JILES, NICHOLAS S. RIZZO, PAUL SABATINE, DONALD G. DAUS, *Assistant Examiners.*